Patented July 7, 1925.

1,545,440

UNITED STATES PATENT OFFICE.

HEINRICH NEUMANN, OF GRAZ, AUSTRIA.

PROCESS FOR REMOVING ASPHALT AND OZOCERITE FROM MIXTURES OF HYDROCARBONS.

No Drawing.   Application filed November 30, 1921.   Serial No. 518,992.

*To all whom it may concern:*

Be it known that I, HEINRICH NEUMANN, citizen of the Republic of Austria, residing at Graz, Styria, in the Republic of Austria, have invented certain new and useful Improvements in Processes for Removing Asphalt and Ozocerite from Mixtures of Hydrocarbons, of which the following is a specification.

The present invention relates to a process of removing asphalt and ozocerite from mixtures of hydrocarbons, especially crude mineral oils and residual oils which remain after distilling off the illuminating oils, and it pertains more particularly to such a process which consists in intimately mixing such hydrocarbons at a raised temperature by incorporating therewith an aqueous solution of inorganic electrolytes such as a concentrated solution of a salt with or without the addition of an acid or an acid of medium concentration. If the concentration of ions in the aqueous solution is correct, the asphalt and resin, contained in colloidal solution in the hydrocarbon mixture, are rendered insoluble. After breaking up the intimate mixture, the aqueous solution is drawn off, the mixture of hydrocarbons is separated from the precipitated asphalt and resin bodies and then allowed to cool thereby separating out the ozocerite-like bodies.

It has now been ascertained that when selecting the salt solutions, the halogen compounds with trivalent iron form the best precipitants and that, when other reagents are employed, the phenomena of precipitation can be extraordinarily accelerated by the presence of even small quantities of these iron compounds. This accelerating action of the dilute solutions of the halogen compounds of the trivalent iron is a property peculiar to the solutions of such compounds and is not possessed by similar aqueous solutions of the salts of the heavy metals, though the latter, when free from water take rank as the most energetic reagents.

The asphalt-precipitating action of a large number of chemically or technically pure salts or acids may, in this way, be materially strengthened and the utilization of this theoretical fact simplifies, shortens and cheapens the deasphaltizing of hydrocarbon masses and therefore the liberating of crude oils from paraffin and residual oils, to a very considerable extent.

This accelerative action is obtained by adding small quantities of a halogen-compound of the trivalent iron to a salt or acid solution or by adding only small quantities of halogen-ions, in any desired way, to solutions containing larger or smaller amounts of the trivalent iron, or by adding the trivalent iron, in any desired manner to solutions containing halogen-ions, or by generating the halogen-compound of the trivalent iron in the oxide form by any known process, when a halogen and trivalent iron are available. The reagent may be used repeatedly so long as trivalent iron is available. Part of the iron is transformed by the process into trivalent iron and may be restored to the oxide form by known means, either during or after the operation.

*Example I.*—100 kgms. of crude East-Galician oil containing paraffin wax which at the ordinary temperature is solid, i. e. is completely gelatinized are, along with 25% of a solution of zinc chloride of a concentration of 50% and containing small quantities of iron chloride ($FeCl_3$) amounting to 1% by weight of the reacting solution, are intimately mixed by heating and maintained in this condition at a temperature of from 80° to 100° C. till no further addition to the precipitate of asphalt-substances as solid bodies is observable. The mixture is kept in this state until a sample of it, allowed to settle, rapidly separates into a clear layer of oil, a precipitate and a salt solution. The oil is left to cool and the solid hydrocarbons which as a rule are already precipitated at the ordinary temperature, are separated by filtration. The hydrocarbons resembling ozocerite thus obtained have a congealing point of 65° C. and yield after refining in the usual manner, a ceresine the melting point of which is 70° C.

*Example II.*—100 kgms. of crude Boryslaw oil, along with 30% of a solution of sulphuric acid containing 55% $H_2SO_4$ and containing besides iron and chlorine-ions to an amount representing 1% $FeCl_3$ by weight of the entire reacting solution, are intimately mixed by heating and the intimate mixture is maintained at a temperature of 80°–100°. The remainder of the process is similar to that in Example I.

I claim—

1. A process of removing asphalt-like constituents and separating ozocerite-like solid hydrocarbons from mixtures of hydrocarbons which comprises intimately mixing such mixture of hydrocarbons at a raised temperature with water, which contains the ions of trivalent iron and halogen ions, allowing the mixture to settle to form an oily and an aqueous layer, and cooling the oily layer to separate therefrom the ozocerite-like solid hydrocarbons.

2. A process of removing asphalt-like constituents and separating ozocerite-like solid hydrocarbons from mixtures of hydrocarbons which comprises intimately mixing such mixture of hydrocarbons at a raised temperature with a solution saturated with an inorganic salt in the cold and containing the ions of trivalent iron and of a halogen, allowing the mixture to settle to separate it into an oily layer and an aqueous layer, and cooling the oily layer to separate therefrom the ozocerite-like solid hydrocarbons.

In testimony whereof I have hereunto set my hand in the presence of two subscribing witnesses.

HEINRICH NEUMANN.

Witnesses:
CHRISTIAN S. GNEUS,
FRIEDRICH FRANK.